United States Patent [19]

Graves

[11] Patent Number: 4,554,539

[45] Date of Patent: Nov. 19, 1985

[54] DRIVER CIRCUIT FOR AN ELECTROLUMINESCENT MATRIX-ADDRESSED DISPLAY

[75] Inventor: Steven P. Graves, Westlake Village, Calif.

[73] Assignee: Rockwell International Corporation, El Segundo, Calif.

[21] Appl. No.: 440,116

[22] Filed: Nov. 8, 1982

[51] Int. Cl.⁴ ............................................. G09G 3/30
[52] U.S. Cl. .................................. 340/805; 340/781; 340/793; 315/169.3
[58] Field of Search ............... 340/811, 805, 793, 781; 315/169.3

[56] References Cited

U.S. PATENT DOCUMENTS

| | | | |
|---|---|---|---|
| 4,021,607 | 5/1977 | Amano | 340/805 |
| 4,024,529 | 5/1977 | Sakai | 340/805 |
| 4,087,792 | 5/1978 | Asars | 340/781 |
| 4,443,741 | 4/1984 | Tanaka et al. | 340/781 |

*Primary Examiner*—Gerald L. Brigance
*Attorney, Agent, or Firm*—H. Fredrick Hamann; Craig O. Malin

[57] ABSTRACT

A driver circuit which operates in a switching mode is provided for an electroluminescent matrix-addressed display. The circuit has a row driver which switches a timed ramp voltage to a selected row of the display. A column driver is used to switch selected columns from a low to a high voltage. The column driver is pulse-modulated (PPM or PWM) so that each pulse is timed to coincide with the ramped voltage to provide a differential voltage peak which provides the desired brightness (or grey scale) at the pixel where the driven row and column cross.

8 Claims, 6 Drawing Figures

DRIVER CIRCUIT FOR AN ELECTROLUMINESCENT MATRIX-ADDRESSED DISPLAY

STATEMENT OF GOVERNMENT INTEREST

This invention was made under a contract with the Department of the Army.

BACKGROUND OF THE INVENTION

This invention relates to the field of electronics and particularly to the field of driver electronics for thin film electroluminescent display devices.

Electroluminescence is the emission of light from a luminescent material when an electric field of sufficient amplitude is applied to the material. This phenomena has been used to construct display panels by using the luminescent material as the dielectric in a parallel plate capacitor in which one of the conducting plates is transparent. When alternating voltages or pulses are applied to the plates, the luminescent material emits light.

Electroluminescent video display panels have been constructed by depositing conductive rows and columns on opposite, non-conductive plates of a capacitor to form an x-y matrix. The coordinates of the matrix are the pixels of the display. When a voltage differential is created between a row and a column, the luminescent material between the crossing electrodes emits light at that pixel.

Electroluminescent technology offers the potential of providing compact, flat panel displays rather than the bulky cathode ray tube displays now in wide use. Small electroluminescent display panels can be driven by integrated solid state circuits to provide miniature video systems that are not practical using cathode ray tube displays.

To realize the potential of electroluminescent displays, drive circuits are required which are inexpensive, reliable, require low power, and fully utilize the electroluminescent capacity of the display, including gray-scale image generation.

Electroluminescent displays can be gray-scale imaged because the brightness of an AC excited luminescent material increases with increasing voltage above the threshold voltage. This property is shown in FIG. 1. In this figure, threshold voltage 2 of the material is approximately 104 volts, and the brightness increases rapidly as the voltage is raised to approximately 118 volts. The brightness can be controlled for gray-scale imaging by amplitude modulation of the applied voltage.

Although the high threshold characteristic for light emission simplifies matrix-addressing an electroluminescent display, it does require the use of high voltage integrated circuits. Additionally, the steepness of the electro-optic response curve (FIG. 1) necessitates good uniformity of output voltage from different drivers for the same desired brightness level.

A prior art, low impedance row driver system which uses analog amplitude modulation for gray-scale manifestation is described in "Practical Application Technologies of Thin-Film Electroluminescent Panels" by M. Takeda, Y. Kanotani, J. Kishishita, T. Inoguchi, and K. Okano as reported in the Society for Information Display's (SID) 1981 San Diego Symposium. The high accuracy, high voltage analog drivers used in such prior art systems are expensive both in cost and in circuit real-estate. Also, an electroluminescent display appears primarily as a capacitive load, thus causing a real impedance driver to dissipate an excessive amount of power.

A prior art system which uses linear drivers is described in "Monolithic Driver Chips for Matrixed Gray-Shaded TFEL Displays" by T. Gielow, R. Holly, and D. Lanzinger, SID 1981 Symposium in New York. Such drivers waste power because the voltage drop and current through the device occur simultaneously. Each column driver will source current into the capacitance of the floating rows as an independent action relative to the current sourced to the driven row. The sourcing (or sinking) of current to the set of nonselected rows is the major contributor to the inefficiency of such prior art drive schemes.

SUMMARY OF THE INVENTION

It is an object of the invention to provide an improved driver circuit for an electroluminescent matrix addressed display.

It is an object of the invention to provide a driver circuit for an electroluminescent matrix-addressed display which has low power dissipation.

It is an object of the invention to provide a driver circuit for an electroluminescent matrix-addressed display which does not require highly accurate, individual analog drivers for each electrode in order to obtain good gray-scaled images.

According to the invention, transistors in the row and column drivers are used in a switching mode to generate an amplitude modulated drive voltage. The brightness desired at any selected pixel is presented to that pixel's column driver as a logic level, pulse-position modulated (PPM) or pulse-width modulated (PWM) signal. The column driver output is switched from low to high by the pulse modulated information.

Meanwhile, the pixel's row driver is source (NFETS with negative select voltage) driven with a ramped voltage so that the peak applied differential voltage at the selected pixel (and therefore its brightness) is a function of the pulse modulated information. The actual pulse modulated timing and row driver ramp amplitude and timing are all controlled in the digital time domain.

These and other features of the invention will be apparent from the following description taken with reference to the accompanying drawings.

DESCRIPTION OF THE PREFERRED EMBODIMENT

Figure 1:
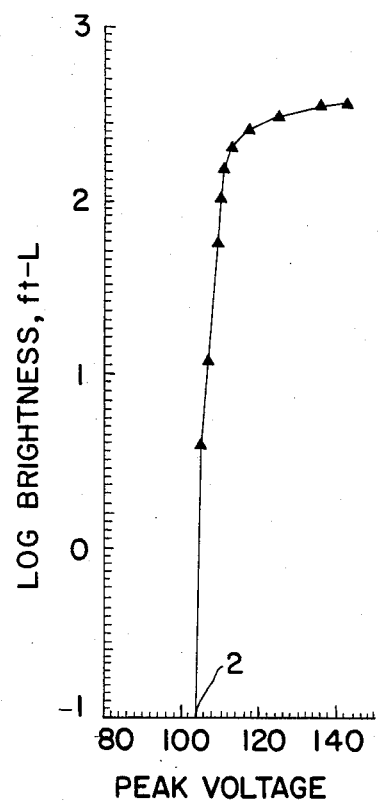
FIG. 1 is a curve showing the electro-optic response of a thin-film electroluminescent material.
Figure 2:
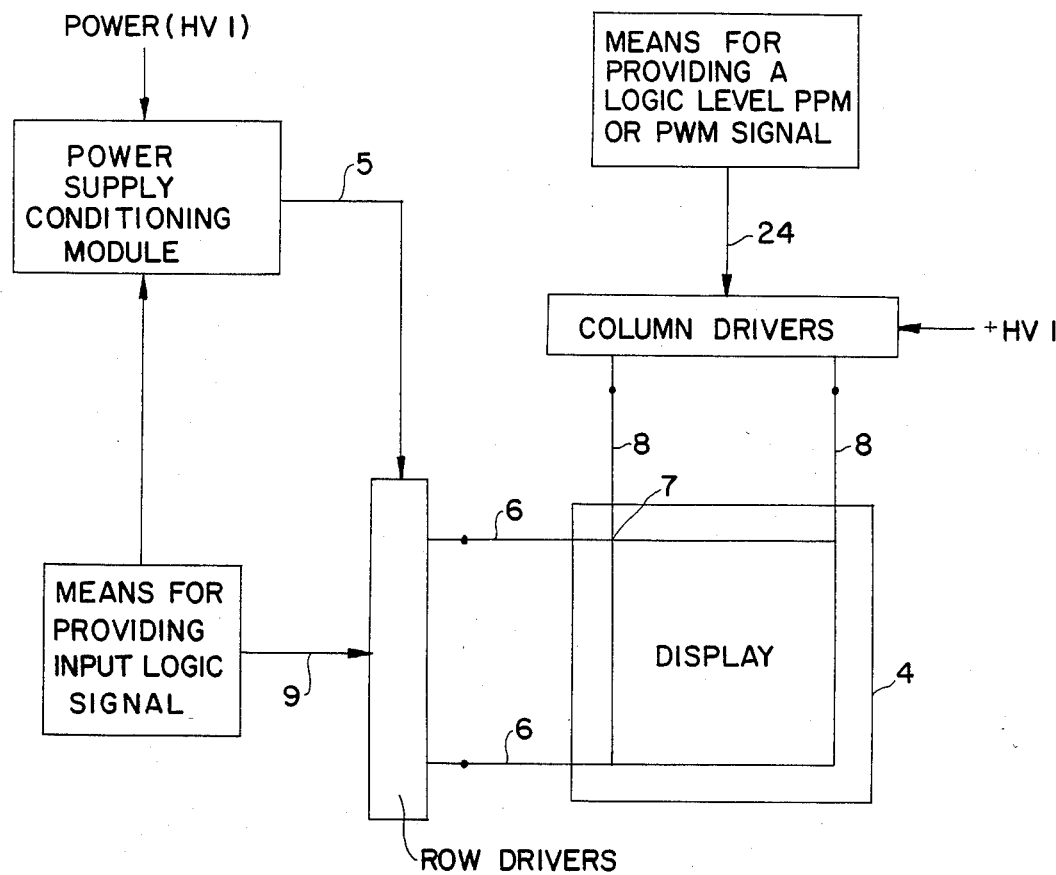
FIG. 2 is a circuit configuration of the driver electronics for a thin-film, electroluminescent, matrix-addressed display.

FIG. 1 is a curve of brightness vs peak voltage for an electroluminescent material which is used in a display such as display 4 shown in the circuit configuration of FIG. 2. Briefly, display 4 is a laminated structure of known design which has numerous rows (for example 345 rows) of electrodes 6 on one side of the laminated structure and numerous columns of electrodes 8 on an opposite side of the laminated structure (only two each shown in FIG. 2). Sandwiched between the electrodes are dielectric films, and an electroluminescent film having brightness vs voltage characteristics similar to those shown in FIG. 1. Those electrodes and the dielectric film on the viewing side of the display are made from transparent materials so that light from the electroluminescent material can be seen.

A pixel 7 is formed at each location where a row electrode 6 and a column electrode 8 cross. The voltage across the electrodes determine the brightness of the pixel in accordance with the curve in FIG. 1. This invention is a driver circuit for controlling the voltage across each pixel in order to form an image.

Figure 3:
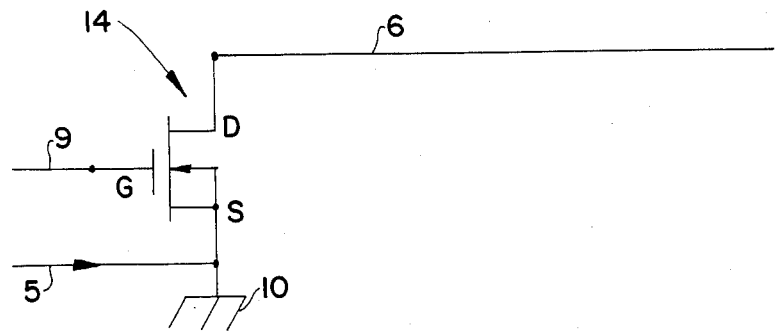
FIG. 3 is a circuit for a row driver.

A separate row driver is provided for each row electrode 6. As shown in FIG. 3, each row driver is typically an open drain, NFET 14, and is source driven with a stair-stepped or ramped voltage, Vs, 5. The sources of all the row driver NFETs are connected in column 10. The row driver input logic signal 9 is DC isolated, and is referenced to the row driver source voltage, Vs, and is driven along with it so that the input logic signals to the drivers do not appear to change incidently to this source drive. Timing of the row driver source is controlled in the digital time domain by signals provided to both the column and row drivers.

Figure 4:
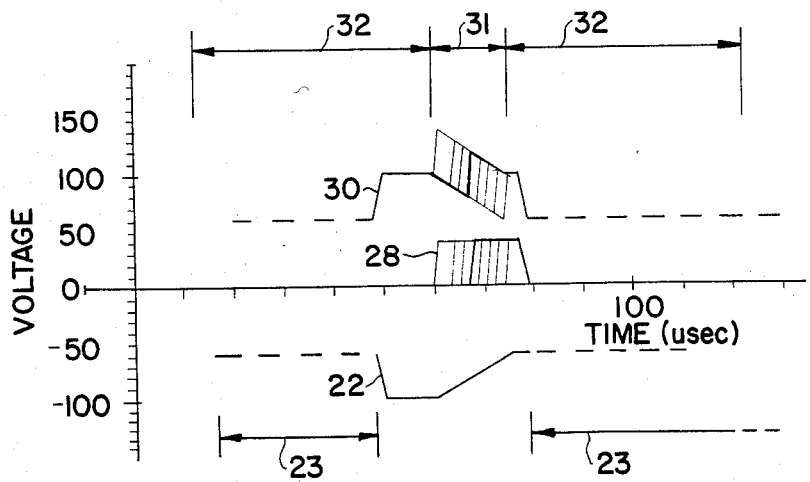
FIG. 4 shows the waveforms for a column driver, a row driver, and the resulting differential pixel drive.

Curve 22 in FIG. 4 shows the output of a row driver during one row drive cycle. The maximum voltage (about minus 100 v) provided to the row is insufficient by itself to exceed the threshold voltage 2 of the electroluminescent material under the selected row electrode. Consequently, the material under the row will not emit light unless a voltage of sufficient amount and of opposite sign is applied to a crossing column. The periods of time 23 when a row is not being addressed are periods of high impedance when NFET 14 is switched off and the voltage of the row is floating at an equilibrium voltage. The high impedance of the unaddressed rows results in minimal power dissipation.

Figure 5:
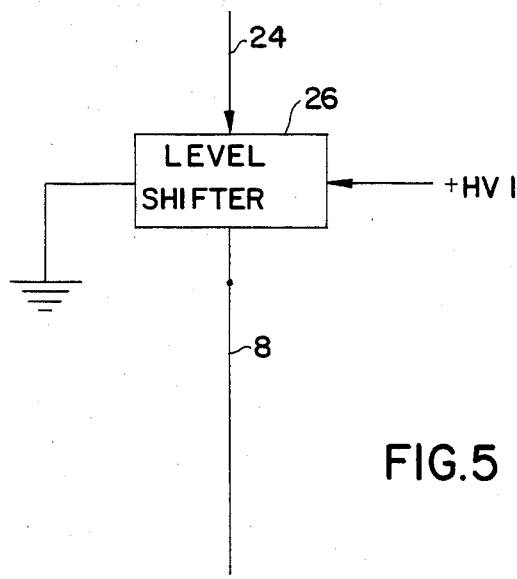
FIG. 5 is a circuit for a column driver.

FIG. 5 is a typical circuit of an individual driver for a single column electrode 8. The desired brightness information for any individual pixel location is presented to the column driver as a logic level pulse-positioned modulated (PPM) or pulse-width modulated (PWM) signal 24. The column driver output is switched from low to high (HV1 level) by the pulse modulated information using the level shifter 26 in a switching mode. Curve 28 in FIG. 4 shows possible outputs of a column driver during one column drive cycle. Multiple column switching points are included in curve 28 to show the possible timing of the switching for a particular column. The heavier trace is an example of a column output required to produce an illumination of intermediate brightness.

Curve 30 shows the possible differential voltages between a column and a row electrode at an individual pixel. The peak applied differential pixel voltage (therefore, the brightness of that pixel) is a function of the pulse modulation information and the ramp level. Because the differential voltage (and only the differential voltage) rises above the threshold voltage of the material, the pixel will emit light of an intensity determined by the timing of the pulse modulated column signal 24. The heavier trace is the differential voltage for an illumination of intermediate brightness corresponding to the heavier trace in curve 28 for the column driver output. The period of time 31 is the electroluminescent drive time when a pixel is illuminated. The remaining period of time 32 is video sampling time.

The use of drive transistors as switches provides simplicity of construction, and (with proper source impedance) allows the driver circuit power dissipation to be displaced to the power supply/conditioning module, away from the drivers. This will then allow higher density integrated driver circuits which will necessarily accompany higher density displays.

The non-linear, electro-optic response of the electroluminescent material in the display can be accommodated in the timing of the ram generator. The multiple switching points for the columns shown in curve 28 to signify different shades can be calibrated to different phosphors. For example, the first time increment shown in curve 28 is noticeably longer because the upper end of the electro-optic response curve (FIG. 1) has a noticeably shallower slope. This greatly reduces the driver circuit complexity while still providing accurate shades for a non-linearly responding electroluminescent material.

Figure 6:
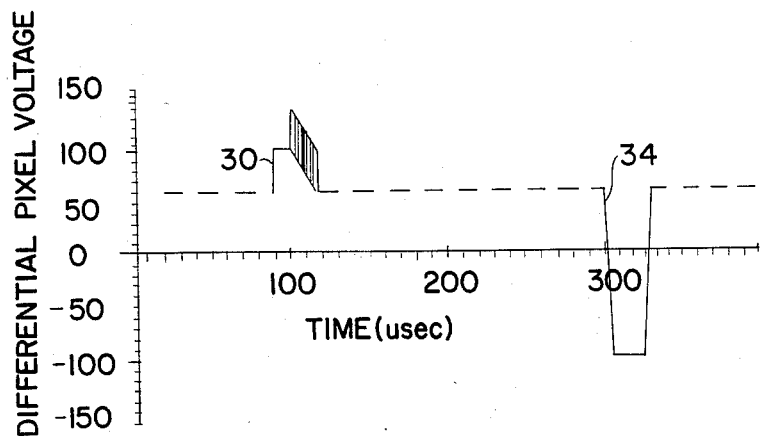
FIG. 6 shows the pixel voltage for a full cycle including the "refresh" step.

FIG. 6 shows row and column driver output differential voltages 30 for a complete cycle, including the "refresh" cycle 34 which completes the AC operation necessary for the electroluminescent display. The waveform for "refresh" cycle 34 is furnished to the row drivers from the power supply conditioning module in addition to the ramped row driver source voltage 5 (FIGS. 2 and 3). As previously described, the differential output voltage 30 is obtained by switching a timed ramped (or stair-stepped voltage) to selected rows in the electroluminescent display. The maximum value of the voltage to the rows is set below the threshold voltage of the display so that the row voltage alone does not cause electroluminescense. Selected column electrodes in the display are switched from a low voltage to a high voltage, the low voltage being insufficient and the high voltage being sufficient to cause electroluminescense at a selected pixel when combined with the timed ramp voltage at the selected pixel.

The column switching is timed by a pulse modulated (PPM or PWM) signal to produce a column and row electrode voltage differential at the selected pixel that provides the desired brightness at the selected pixel. The column pulse timing and row driver ramp amplitude timing are all controlled in the digital time domain. Schemes of selecting particular rows and columns for providing a video picture (such as a line-at-a-time addressing) are well known in the art and can be readily used with the driver circuit of this invention.

Numerous variations and modifications can be made without departing from the invention. For example, the timed ramped voltage (row voltage) can be at a level (above threshold) sufficient to cause electroluminescense, and the voltage on the crossing electrode (column voltage) can be maintained at a level which causes the value of the differential voltage at a pixel to be below the threshold. The PPM signal can then be timed to switch the column voltage to a level which causes the differential at a pixel to exceed the threshold voltage and provide the desired brightness. Inverse schemes can also be utilized which provide a negative image.

The term "ramped voltage" is intended to apply to any voltage which varies with time including a stair-stepped voltage. Columns and rows can be used to identify any crossing electrodes on the display. Accordingly, it should be clearly understood that the form of the invention described above and shown in the accompanying drawings is illustrative only and is not intended to limit the scope of the invention.

What is claimed is:

1. A driver circuit for a thin film AC electroluminescent matrix-addressed display comprising:
   row drivers having switching means for applying a timed ramp voltage to a selected row of said display;
   a single power supply conditioning module for providing all said row drivers with the same voltage input;
   means for providing an input logic signal to said row driver, said logic signal being referenced to said conditioning module;
   a column driver having means for switching selected columns from a first to a second voltage, said first voltage being insufficient and said second voltage being sufficient to cause electroluminescence at a selected pixel in said display when combined with said ramp voltage; and
   a means for providing an input logic level pulse-modulated signal to said column driver, whereby said column switching is timed to coincide with a selected voltage from said ramped voltage and thereby to produce a differential column and row voltage at said selected pixel that provides the desired brightness at said selected pixel.

2. The driver circuit as claimed in claim 1, wherein said row driver comprises an open drain NFET which is source driven with said ramped voltage input.

3. The driver circuit as claimed in claim 1, wherein said pulse modulated signal comprises a pulse-position modulated signal.

4. The driver circuit as claimed in claim 1 wherein said pulse modulated signal comprises a pulse-width modulated signal.

5. A method of driving a thin film AC electroluminescent matrix-addressed display, comprising the steps of:
   switching the same time ramped voltage from a single power supply conditioning module to selected rows of said display;
   switching selected columns of said display from a first to a second voltage, said first voltage being insufficient and said second voltage being sufficient to cause electroluminescence at a selected pixel in said display when combined with said timed ramp voltage, said column switching being timed by a pulse-modulated signal to coincide with a selected voltage from said ramped voltage and thereby to produce a differential column and row voltage at said selected pixel that provides the desired brightness at said selected pixel.

6. The method as claimed in claim 5 wherein said step of switching a timed ramped voltage to selected rows comprises switching an open-drain NFET which is source driven with a ramped voltage.

7. The method as claimed in claim 5 wherein said pulse modulated signal comprises a pulse-position modulated signal.

8. The method as claimed in claim 5 wherein said pulse modulated signal comprises a pulse-width modulated signal.

* * * * *